United States Patent [19]
Li et al.

[11] Patent Number: 5,357,363
[45] Date of Patent: Oct. 18, 1994

[54] INTERCONNECTIONS HAVING IMPROVED SIGNAL-TO-NOISE RATIO

[75] Inventors: Chung-Sheng Li, Berkeley, Calif.; Karen Liu, Montclair, N.J.; Harold S. Stone, Chappaqua, N.Y.; Franklin F. Tong, Stamford, Conn.

[73] Assignee: International Business Machines Corporation, Armonk, N.Y.

[21] Appl. No.: 126,131

[22] Filed: Sep. 24, 1993

Related U.S. Application Data

[63] Continuation of Ser. No. 699,053, May 13, 1991, abandoned.

[51] Int. Cl.⁵ .................................................. G02C 6/28
[52] U.S. Cl. ................................. 359/161; 359/152; 359/160
[58] Field of Search ............... 359/124, 154, 160, 173, 359/174, 176, 179, 150, 152, 162, 163, 161

[56] References Cited

U.S. PATENT DOCUMENTS

| | | |
|---|---|---|
| 3,532,889 | 10/1970 | Kompfner . |
| 3,851,167 | 11/1974 | Levine . |
| 3,887,876 | 6/1975 | Zeidler ................................ 359/176 |
| 4,316,141 | 2/1982 | Adolfsson et al. .................. 359/143 |
| 4,393,515 | 7/1983 | de Neumann . |
| 4,420,842 | 12/1983 | Kuhn .................................. 359/173 |
| 4,422,088 | 12/1983 | Gfeller . |
| 4,430,572 | 2/1984 | Eve et al. ............................ 359/124 |
| 4,480,229 | 10/1984 | Van Kessel et al. ................. 330/85 |
| 4,491,802 | 1/1985 | Uchida et al. ....................... 330/854 |
| 4,507,775 | 3/1985 | Sheem ................................ 359/158 |
| 4,682,323 | 7/1987 | Corfield et al. . |
| 4,742,307 | 5/1988 | Thylen . |
| 4,747,094 | 4/1988 | Sakaguchi et al. .................. 359/174 |
| 4,747,650 | 5/1988 | Sakuda ............................... 359/341 |
| 4,764,984 | 8/1988 | Franke et al. ...................... 359/172 |
| 4,794,346 | 12/1988 | Miller ................................... 372/49 |
| 4,859,015 | 8/1989 | Krinsky et al. . |
| 4,879,762 | 11/1989 | Hanyuda et al. ................... 359/176 |
| 4,881,790 | 11/1989 | Mollenauer . |
| 4,939,475 | 7/1990 | Prasse et al. ....................... 330/308 |
| 4,959,837 | 9/1990 | Fevrier et al. . |
| 4,962,995 | 10/1990 | Andrews et al. . |
| 4,989,934 | 2/1991 | Zauracky et al. ................... 359/152 |
| 5,017,885 | 5/1991 | Saleh .................................. 359/337 |
| 5,058,974 | 10/1991 | Mollenauer ......................... 385/24 |
| 5,083,874 | 1/1992 | Aida et al. .......................... 359/154 |

OTHER PUBLICATIONS

Rick Lytel, "Optical Interconnects for Electronic Systems Users," *Handout from an oral presentation at the DARPA Optoelectronics Workshop*, Jan. 31, 1991 in Arlington, Virginia.

S. Forrest, "New Approaches to High Density, High Band-width Interconnections Using Optically Powered OEICs," *Handout from an oral presentation at the*

(List continued on next page.)

Primary Examiner—Richard E. Chilcot, Jr.
Assistant Examiner—Rafael Bacares
Attorney, Agent, or Firm—Sterne, Kessler, Goldstein & Fox

[57] ABSTRACT

The invention is a system and method for improving the signal-to-noise ratio of an electrical data signal transmitted between two electronic modules. An electrical data signal from a first module is amplified by an electrical amplifier to produce an amplified electrical data signal. The electrical amplifier is supplied by a power distribution network. The amplified electrical data signal has a power level sufficiently low such that the electrical amplifier does not cause significant disturbances in the power distribution network so that a plurality of the electrical amplifiers can be proximately located and operated concurrently without significant noise coupling occurring between the electrical amplifiers through the power distribution network. The electrical data signal is then converted to an optical data signal for transmission to a second module. The optical data signal is transmitted to the second module through an optical path where it is optically amplified. The amplified optical data signal is then received at the second module and detected to produce an electrical signal which has a substantially improved signal-to-noise ratio.

18 Claims, 9 Drawing Sheets

OTHER PUBLICATIONS

*DARPA Optoelectronics Workshop,* Jan. 31, 1991 in Arlington, Va.

M. Nido et al., "High Power and Low Optical Feedback Noise AlGaAs Single Quantum Well Lasers," *Electron. Lett.,* 1989, 25, pp. 277–278.

D. Welch et al., "High-Power Index-Guided Lasers Emitting in a Single Transverse Mode," *Conference on Lasers and Electrooptics,* paper WB4, 1989.

N. Sanford, et al., "Integrated-optic Waveguide Glass Lasers," *OFC '91,* paper TuG2, Tuesday, Feb. 19, 1991.

P. Shumate, "Semiconductor Laser Transmitters," Chapter 15 of *Optoelectronic Technology and Lightwave Communications Systems,* edited by Chinlon Lin, pp. 403–440.

J. C. Campbell et al., "Dual Wavelength Demultiplexer InGaAsP Photodetector," *Appl. Phys. Letter,* vol. 41, 1982, pp. 192–193.

C. P. Millar, "Semiconductor Laser Amplifiers and Active Filter Amplifiers," Course notes given at the Optical Fiber Communication Conference, Feb. 6, 1989.

INTERCONNECTIONS HAVING IMPROVED SIGNAL-TO-NOISE RATIO

This application is a continuation, of application Ser. No. 07/699,053, filed May 13, 1991 now abandoned.

TECHNICAL FIELD

This invention relates to the field of module-to-module interconnections in electronic systems using optical waveguides that achieve enhanced signal-to-noise ratios.

BACKGROUND ART

Conventional inter-module interconnections in computer systems are effected using metal (e.g., copper) wires or circuit board runs. Metal interconnections currently support parallel data transfers to a bit rate of roughly 100 MHz. While it is desirable to increase this rate, the metal interconnections are limited by bandwidth and noise factors.

Optical interconnections may be used to replace the metal ones. U.S. Pat. No. 3,851,167 to Levine, U.S. Pat. No. 4,422,088 to Gfeller, and U.S. Pat. No. 4,881,790 to Mollenauer are examples of optical communication systems. While these optical communication systems have advantages over the metal interconnection, an optical system is susceptible to many of the same noise sources.

The present invention seeks to improve the signal-to-noise ratio available from known interconnections by eliminating the major sources of noise contamination.

DISCLOSURE OF INVENTION

The invention is a system and method for improving the signal-to-noise ratio of an electrical data signal transmitted between two electronic modules. An electrical data signal from a first module is amplified by an electrical amplifier to produce an amplified electrical data signal. The electrical amplifier is supplied by a power distribution network. The amplified electrical data signal has a power level sufficiently low such that the electrical amplifier does not cause significant disturbances in the power distribution network so that a plurality of the electrical amplifiers can be proximately located and operated concurrently without significant noise coupling occurring between the electrical amplifiers through the power distribution network. The electrical data signal is then converted to an optical data signal for transmission to a second module. The optical data signal is transmitted to the second module through an optical path where it is optically amplified. The amplified optical data signal is then received at the second module and detected to produce an electrical signal which has a substantially improved signal-to-noise ratio.

In a preferred embodiment, the optical path is a doped waveguide and the optical amplification is accomplished by pumping the waveguide with a pump laser. By performing the amplification required to achieve reliable signal transmission optically rather than electrically, the signal-to-noise ratio of the received signal is greatly improved.

It is an advantage of the present invention that a plurality of interconnections can be operated simultaneously and in close proximity without substantial noise being coupled between the interconnections through the power distribution network.

The foregoing and other objects, features and advantages of the invention will be apparent from the following more particular description of preferred embodiments of the invention, as illustrated in the accompanying drawings.

BEST MODE FOR CARRYING OUT THE INVENTION

The invention is a system and method for increasing the signal-to-noise ratio (SNR) for inter-module or module to module interconnections in a computer or other electronic system. A module as used herein may be an integrated circuit chip, a circuit board, a circuit assembly, or an entire electronic assembly. Thus, module-to-module can mean chip to chip, box to box, board to board, etcetera.

Figure 1:
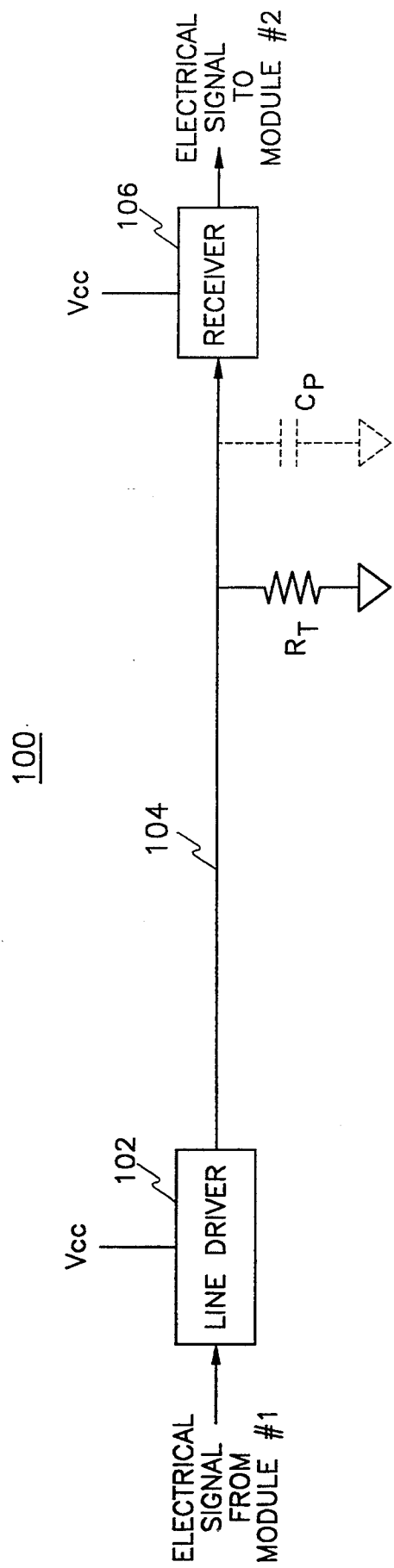
FIG. 1 is a block diagram of a conventional (metal) interconnection link.

It is known in the art to perform inter-module communications via a metal interconnection link. One such link is shown in FIG. 1. A metal interconnection link 100 includes a line driver (transmitter) 102, a conductor 104, and a receiver 106. A terminating resistor $R_T$ is connected between conductor 104 and ground at the input of receiver 106. A parasitic capacitor $C_P$ is shown connected across $R_T$. Line driver 102 and receiver 106 are powered by a system power supply ($V_{CC}$) via a power distribution network.

Operation of link 100 is as follows. A digital electrical signal to be transmitted from a first module is input to line driver 102. Driver 102 modulates supply voltage $V_{CC}$ by the electrical signal and provides the modulated signal to conductor 104. Receiver 106 detects and amplifies the signal from conductor 104. $R_T$ is used to match the impedance of conductor 104 with the input impedance of receiver 106. $C_P$ represents the parasitic capacitance present at the junction between conductor 104 and receiver 106.

At high frequencies, noise is a substantially limiting factor in metal interconnection link 100. The major sources of noise contamination associated link 100 include the following:

POWER SUPPLY ΔI NOISE

Power supplies are imperfect sources of power. The output voltage $V_{CC}$ from the power distribution network may vary as the load (ΔI) on the network varies. Line driver 102 and receiver 106, both of which are supplied by the power distribution network, will introduce ΔI noise into the data signal. In addition to being susceptible to ΔI noise, line driver 102 is a principal cause of the disturbances which make up the power supply ΔI noise. ΔI noise is the principal source of noise for link 100.

Because the transmitter (line driver 102) is both susceptible to and a source of ΔI noise, noise coupling through the power distribution network can occur between proximately located transmitters. Transmitters of other interconnection links that are located on the same chip are especially sensitive to this coupling effect.

GROUND LIFTING

Ground lifting is closely related to ΔI noise. signal voltages transmitted on link 100 are referenced to a ground potential. The ground potential at receiver 106, however, may be different from the ground potential at the line driver 102. This difference results because the ground paths in the power distribution network are not perfect conductors and have distributed resistances and inductances associated with them. Currents flowing in the ground paths will cause voltage drops across these distributed impedances.

CROSS-TALK NOISE

This noise is produced by capacitive and inductive coupling between electrical conductors carrying a high frequency signal in close proximity to one another.

REFLECTION NOISE

Metal conductor 104 has a characteristic wave impedance ($R_{LINE}$) that determines the ratio of voltage to current of a wave travelling in the conductor. If the termination at the receiver end of the conductor does not match the wave impedance, then part of the wave will be reflected back to the source of the wave, where a similar reflection may occur. $R_T$ is used to match the impedances in an effort to minimize this reflection noise.

RECEIVER THRESHOLD DEVIATION

Receiver 106 discriminates between two different signal levels by comparing a received signal against an internal threshold. Because it is not possible to manufacture devices which have identical thresholds, each receiver 106 is specified to have a threshold which falls within a specified range of values. Thus, each receiver may have a threshold which deviates from a nominal value. A deviation of the threshold has the same effect on the SNR as injecting a noise having an amplitude equal to the deviation amount into the receiver.

AMPLIFIER NOISE, AMPLIFIER DELAY AND VARIATIONS OF AMPLIFIER DELAY

Amplification inherently introduces noise and delay. In the conventional system, amplification is done electronically by receiver 106. The amplifier noise and added delay will decrease the SNR.

TIMING JITTER AND DELAY VARIATIONS

Timing jitter is caused by noise on the leading edge of a signal pulse received at receiver 106. Near the threshold of receiver 106, the noise superimposed on the signal pulse will cause the pulse amplitude to vary such that receiver 106 will trip at an unpredictable time as compared with a noise-free signal pulse.

Timing jitter and delay variations (skew) are increased as the rise-time or total interconnect delay of a signal pulse is increased. While it would be advantageous to have a fast rise-time, the rise-time of a signal pulse in conductor 104 will be limited by parasitic capacitor $C_P$. $C_P$ will prevent line driver 102 from making instantaneous changes in the voltage signal on conductor 104.

The combination of the $R_{LINE}$, $R_T$ and $C_P$ result in an RC time constant ($\tau$) for conductor 104. If line driver 102 attempts to step the voltage on conductor 104 in a time less than $\tau$, then a substantial portion of the stepped voltage signal will be reflected back at line driver 102. To avoid this reflection, line driver 102 is controlled such that it has a LOW to HIGH rise-time much greater than $\tau$. While this avoids the reflection problem, the increase in rise-time will result in additional timing jitter. Both the timing jitter and the rise-time delay will limit the bit rate which can be used for signal transfer.

Several of these noise problems (e.g., ΔI noise, ground lifting, and cross-talk) associated with metal interconnections will be intensified as the interconnection density is increased.

Figure 2A:
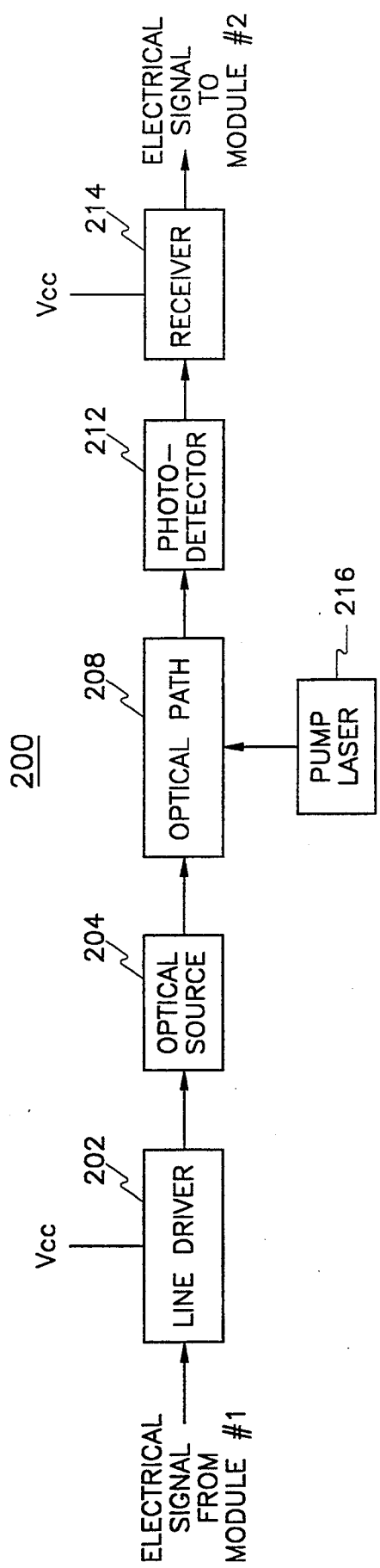
FIG. 2A is a block diagram of the optical interconnection link of the present invention.

The present invention is an optical interconnection scheme which eliminates or attenuates each of the noise sources indicated above. Optical interconnection link 200 is shown in FIG. 2A. Link 200 includes line driver 202, optical source 204, optical path 208, photo-detector 212, receiver 214, and pump laser 216.

Operation of link 200 is as follows. An electrical data signal to be transmitted from a first module is input to line driver 202. Driver 202 modulates the supply voltage $V_{CC}$ by the electrical data signal to provide an amplified data signal to optical source 204. Line driver 202 and optical source 204 make up a transmitter portion of the interconnection link. Optical source 204 may be a light emitting diode (LED) or a laser diode. Optical source 204 produces a low-power optical data signal (light beam) which is transmitted through optical path 208.

The optical data signal produced in this manner is deliberately of low intensity (i.e., low power). This is done to avoid producing disturbances in the power distribution network which can be coupled to other proximately disposed transmitters. The inventors have discovered that by reducing the power consumption of each transmitter, a plurality of transmitters can be operated simultaneously and in close proximity without significant noise coupling occurring therebetween.

Figure 2B:
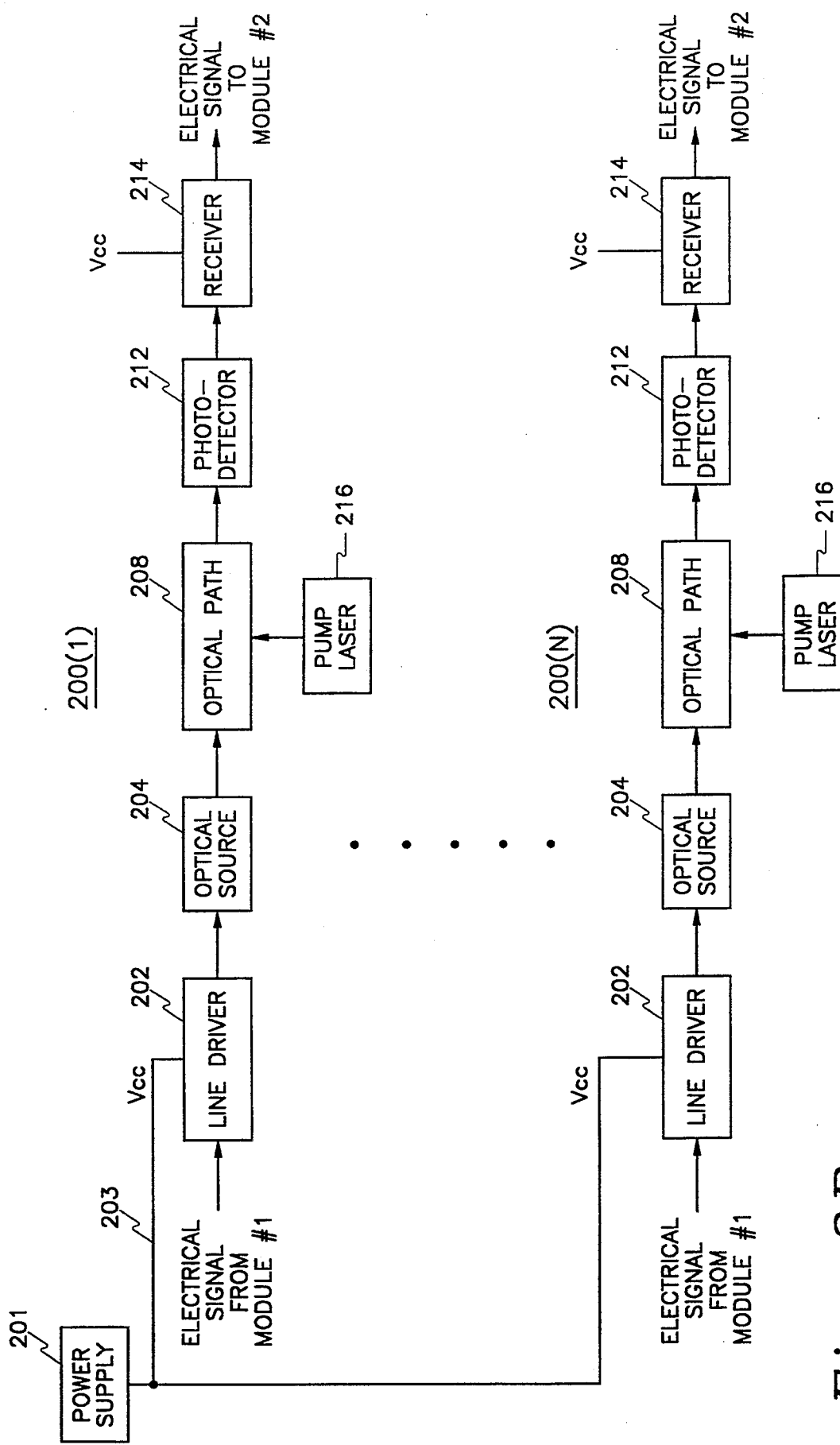
FIG. 2B is a block diagram of a system including a plurality of optical interconnection links operating simultaneously and in close proximity.

This is illustrated in FIG. 2B, where a plurality (N) of optical interconnection links 200 are operated simultaneously and in close proximity. A power distribution network 203 including a power supply 201 provides a supply voltage ($V_{cc}$) to line drivers 202.

Because a low power optical data signal is transmitted, amplification is required before the signal can be reliably detected at the receiving end of the link. This amplification is performed by an optical amplifier. In the preferred embodiment, pump laser 216 and optical path 208 comprise the optical amplifier. Other means for performing the optical amplification, however, may be used. These include nonlinear optical gating or nonlinear optical amplification.

That the transmitted optical data signal is of low intensity is an important feature of the invention. By transmitting a low power data signal (i.e., a signal that has been only slightly electrically amplified) and then optically amplifying (i.e., a low-noise source of amplification) the transmitted signal, the load on the system power supply is reduced such that only negligible disturbances are caused in the power distribution network. This has numerous advantages as discussed in detail below.

The principles of optical amplification are well established. The mechanism is identical to that of a laser. A light beam from an optical pump (e.g., pump laser 216) and a data signal are passed through a light path which is doped with rare earth ions. As the light beam propagates through the path, it excites the rare earth ions causing a population inversion. The energy stored in the inverted population of excited ions is then transferred to the data signal as it propagates in the same optical path. This causes the data signal to experience an increase in optical power (i.e., a gain). The light beam produced by the optical pump must be resonant with at least one of the ion's absorption lines.

Optical path 208 is a doped waveguide. Pump laser 216 produces the pumping light which is passed through optical path 208 with the optical data signal. The pumping light "pumps" optical path 208 such that the optical data signal from optical source 204 is optically amplified. The optical data signal is then detected by photo-detector 212 at the receiving end of the interconnection link. Photo-detector 212 produces an electrical signal representing the optical data signal. The electrical signal is then detected and amplified by receiver 214.

Alternatively, optical path 208 (which includes a gain section) may be a doped optical fiber, a semiconductor optical amplifier, or a semiconductor waveguide. The semiconductor optical amplifier can be pumped electrically or optically. In each of these embodiments, amplification need not take place along the entire light path, but can be restricted to take place in specific regions of the path. Further, the optical data signal need not be guided along the entire optical path. The optical path may have open segments where the optical data signal is permitted to propagate through the surrounding atmosphere.

As indicated above, by transmitting a low-power optical data signal and then amplifying that signal optically rather than electrically, all major sources of noise associated with link 100 can be either attenuated or eliminated.

POWER SUPPLY ΔI NOISE

The current drawn by line driver 202 (i.e., the supply current for optical source 204) is much less than the current drawn by line driver 102 [i.e., $V_{CC}/(R_{LINE}+R_T)$] such that ΔI noise can be substantially reduced. This allows a plurality of optical paths to be operated concurrently without causing or sensing appreciable disturbances on the power distribution network. ΔI noise can be further reduced by supplying pump laser 216 from an isolated power supply.

GROUND LIFTING

Ground lifting will also be reduced by interconnection link 200. Because the current drawn by line driver 202 is much less than the current drawn by line driver 102, less current will be flowing in the ground paths of link 200 such that ground lifting for line driver 202 will be reduced. Ground lifting will be further reduced because pump laser 216 is supplied by a separate power supply.

Link 200 may be a bi-directional link. If so, then an additional transmitter will be associated with receiver 214 and an additional receiver will be associated with line driver 202. In that case, the receivers will experience less ground lifting than would a comparable metal bi-directional link due to the reduced current draw of the transmitters in the optical system.

CROSS-TALK NOISE

To the extent that optical path 208 may be susceptible to evanescent coupling with a closely adjacent optical path, the paths may be separated such that coupling is negligible. While spacing may also be used to eliminate electromagnetic coupling in a metal link, the spacing required to achieve sufficient isolation in the metal system is much greater.

REFLECTION NOISE

Light reflections produced in optical path 208 and at detector 212 may be removed using optical isolators, and the like, as are well known in the art.

RECEIVER THRESHOLD DEVIATION

While the receiver threshold deviation noise will not be eliminated by link 200 alone, it may be eliminated using the dual-wavelength modulation scheme set forth below.

AMPLIFIER NOISE, AMPLIFIER DELAY AND VARIATIONS OF AMPLIFIER DELAY

In the preferred embodiment, amplification is done both optically in the optical path 208 and electronically at receiver 214. Optical amplification introduces much less noise than the electronic amplification. Thus, a majority of the required amplification will be accomplished by the optical amplifier (path 208 and pump laser 216) such that the total amplifier noise will be greatly reduced as compared to the metal interconnection link.

In addition, the optical amplification is much faster than the electronic amplification such that both the signal delays as well as the delay variations will be reduced.

TIMING JITTER AND DELAY VARIATIONS

Optical source 204 can turn ON much quicker than line driver 102 can pull conductor 104 HIGH at the input to receiver 106. Accordingly, rise-time delays, the resulting jitter, and the delay variations will be reduced in the optical system. Also, since the noise at the input of receiver 214 has been attenuated in link 200, the timing jitter will be further reduced.

Figure 3:
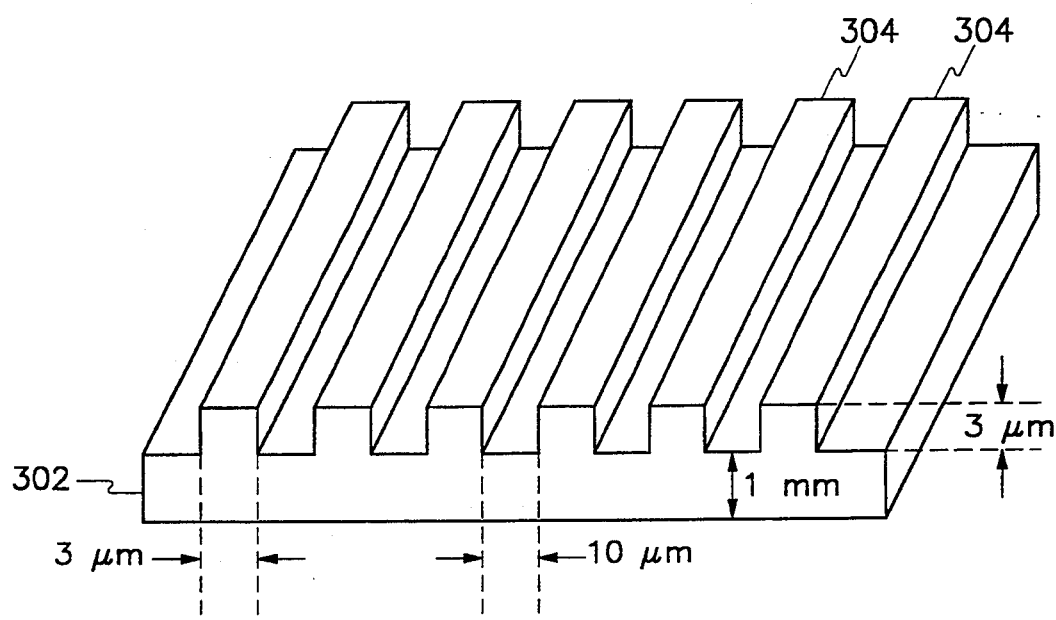
FIG. 3 is a perspective view of waveguide structure 300 of the present invention.

The preferred embodiment of optical path 208 is shown in FIG. 3. A waveguide structure 300 has a substrate 302 with a plurality of doped waveguides 304 disposed thereon. Substrate 302 may be constructed of silicon, ceramic or other suitable materials. Waveguides 304 are preferably made from polyimide, glass, or other silica based materials as is known in the art for constructing optical waveguides.

Typical dimensions of waveguide structure 300 are shown. For a single-mode waveguide, the guiding region (i.e., waveguide 304) is preferably 3 μm by 3 μm and is separated from an adjacent guiding region by at least 10 μm. The inventors have discovered that evanescent coupling can be greatly reduced with this inter-waveguide spacing of at least 10 μm. Substrate 302 may be about 1 mm thick. It should be understood that these dimensions are given by way of example, and that the dimensions for an actual application will depend upon the power density and saturation characteristics of the entire optical link system.

While, the length of guiding structure 300 will be determined by the distance between the modules requiring the interconnect, the length of the doped area of waveguide 304 should be limited by the absorption depth of the pump light from pump laser 216 in waveguide 304. This absorption depth depends on the pumping configuration, doping concentration, absorption cross section, incident power, and the pump laser beam diameter. If the length of the doped area exceeds the absorption depth, then degradation in the amplification of the optical signal will result because the unexcited doping ions will attenuate the optical data signal.

Consequently, a longitudinal portion of each waveguide 304 is doped with rare earth ions. The preferred dopant is either $Er^{3+}$ (Erbium ion) or $Nd^{3+}$ (Neodymium ion). The typical solubility of these rare earth ions is 0.1 to 1.0 percent by weight. Both of these ions have atomic transitions at or around the laser emission wavelengths of laser diodes used as transmitters in a communication system. In particular, the atomic transition of $^4I_{15/2} \rightarrow {}^4I_{9/2}$ in $Nd'^+$ is suitable for amplification of a signal at a wavelength of 1.3 μm, which is the emission wavelength for a InGaAsP laser diode (e.g., optical source 204). For the $Er^{3+}$ ions, the atomic transition of $^4I_{13/2} \rightarrow {}^4I_{15/2}$ will produce amplification at a signal wavelength of 1.53 μm.

The required excitation of the $Er^{3+}$ or $Nd^{3+}$ ions can be accomplished with an AlGaAs diode laser array (pump laser 216) emitting light at a wavelength of approximately 0.8 μm (i.e., the absorption wavelength associated with an atomic transition from the ground state for the $Er^{3+}$ and $Nd^{3+}$ ions).

Figure 4:
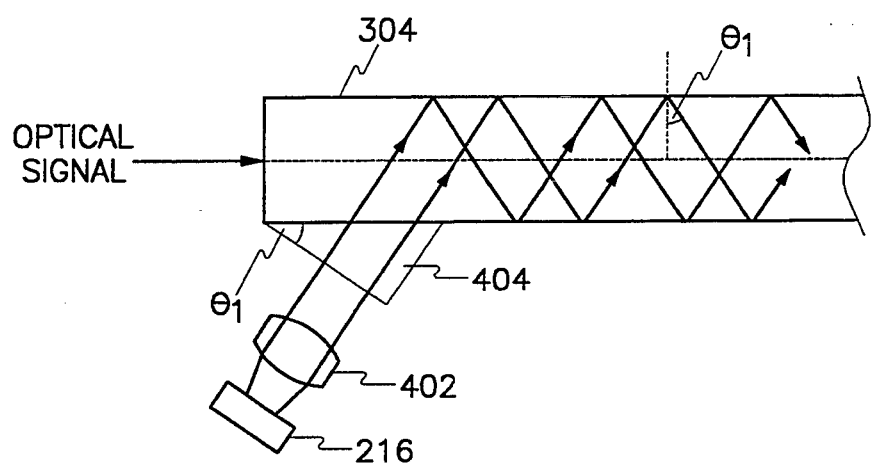
FIG. 4 shows one potential pumping scheme for optical path 208.

FIG. 4 shows one possible pumping scheme for waveguide 304. Pump light from pump laser 216 is passed through a collimating lens 402 and then through a prism 404. The surface of prism 404 may be coated with an anti-reflective coating. The interface between prism 404 and waveguide 304 is filled with an index-matching fluid or gel to minimize the amount of pump light lost by reflection. In addition, the angle $\theta_1$ formed between the incident face of prism 404 and waveguide 304 is greater than 42 degrees such that the pump light will be totally internally reflected within waveguide 304. In this manner, the absorption of the pump light is maximized.

Figure 5:
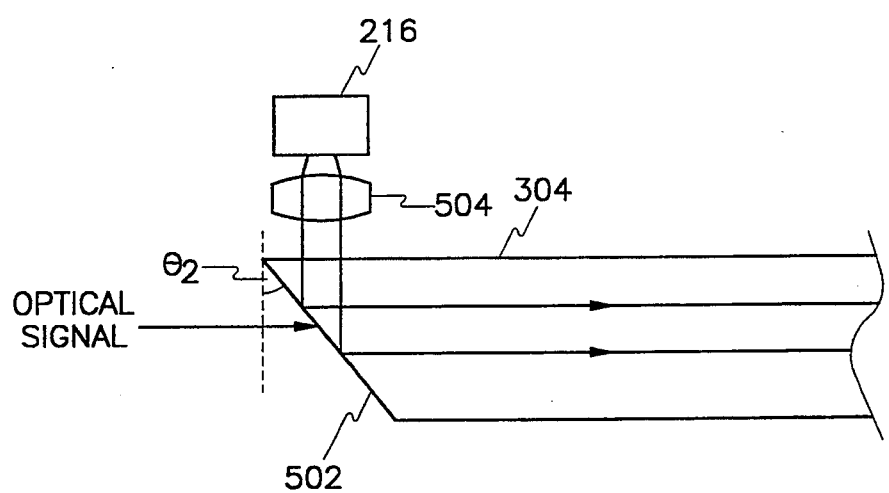
FIG. 5 shows an alternate pumping scheme for optical path 208.

FIG. 5 shows an alternate pumping scheme for waveguide 304. The front facet 502 of waveguide 304 is at an angle $\theta_2$, where $\theta_2$ is equal to 45 degrees. Pump light from pump laser 216 is passed through a collimating lens 504 and then into waveguide 304 where it is incident on facet 502 such that the pump light is reflected into and parallel with waveguide 304. This pumping scheme will be more efficient than the scheme shown in FIG. 4, however, coupling with the waveguide at facet 502 will be complicated.

While it is an object of the invention to reduce or eliminate all of the major noise sources present in a metal interconnection link without introducing any comparable new noise sources, there is a potential noise source in optical link 200 which is not present in metal link 100. The noise is known as inter-symbol interference and is caused by temporal variations in the gain in an optical waveguide.

The density of excited ions in a waveguide is a function of both optical pumping power and of optical data signal power. The optical data signal tends to de-excite the doping ions while the optical pumping light tends to excite the doping ions. Thus, as the optical data signal is modulated, the density of excited ions will also be modulated. Since, optical amplification in waveguide 304 is dependent on the instantaneous excited ion concentration, the amplification can vary over time, causing inter-symbol interference (noise).

Figure 6:
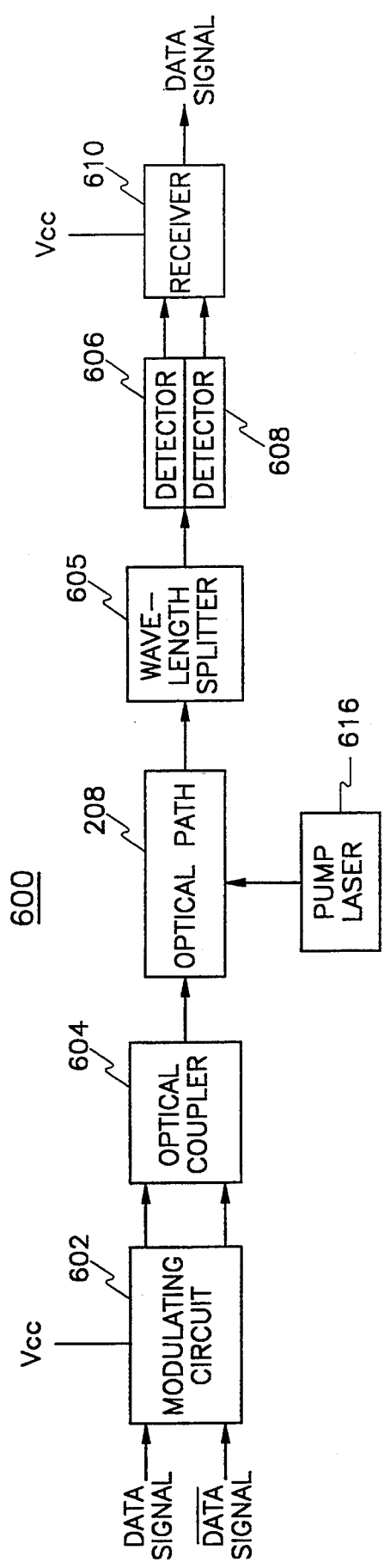
FIG. 6 shows an alternate embodiment of the optical interconnection link of the present invention.

While the long time-constant for the decay of excited ions of Erbium and Neodymium reduces this noise somewhat, the present invention eliminates inter-symbol interference via a dual-wavelength modulation scheme 600 as shown in FIG. 6. In this scheme, a dual-wavelength modulation circuit 602 generates both an optical data signal ($\lambda_1$) and its complementary signal ($\lambda_2$). These two optical data signals are combined by an optical coupler 604 and simultaneously transmitted in optical path 208. The two optical data signals are separated in wavelength (i.e., $\lambda_1 \neq \lambda_2$) such that each can be distinctly detected at the receiving end of the optical path.

At the receiving end of the optical path, a wavelength splitter 605 produces two output beams, one directed to a first detector 606 and one directed to a second detector 608. Detector 606 is sensitive to the optical data signal wavelength ($\lambda_1$), while detector 608 is sensitive to the wavelength ($\lambda_2$) of the complement optical data signal. These beams are complementary. That is, the presence of energy on one beam signifies a logical HIGH while the presence of energy on the other beam signifies a logical LOW for the optical data signal.

The electrical signal from each detector is input to a receiver 610. Receiver 610 is a differential amplifier which detects the HIGH or LOW signal as a difference between the two received signals. In this manner, constant optical data signal power is maintained in the optical path at all times such that inter-symbol interference is eliminated. An additional advantage of this embodiment is that receiver threshold deviation noise is eliminated.

Figure 7:
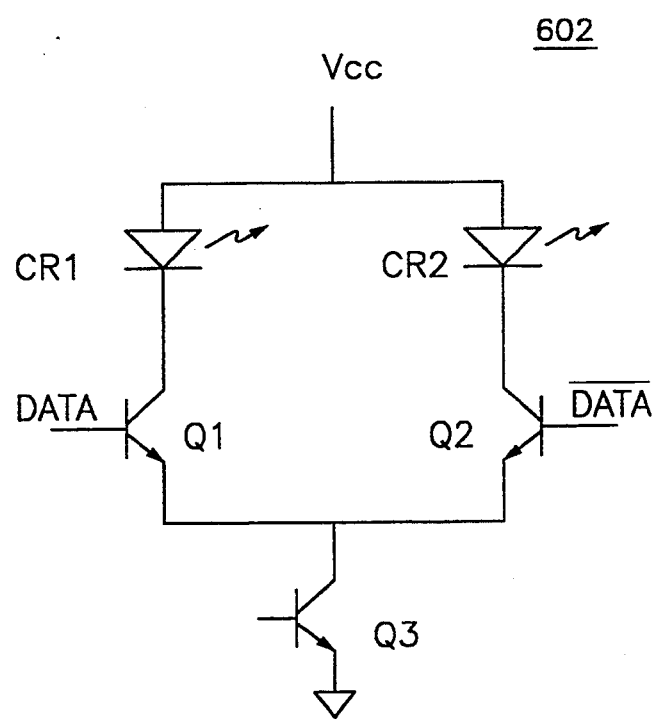
FIG. 7 is a schematic diagram of dual-wavelength modulation circuit 602.

FIG. 7 shows the preferred embodiment of dual-wavelength modulation circuit 602. Circuit 602 includes transistor switches Q1-Q3, and laser diodes CR1 and CR2. Q1 and Q2 are connected in a differential pair arrangement with CR1 connected in series with Q1, and with CR2 connected in series with Q2. Q3 controls current flow through the differential pair. The optical data signal controls Q1, while the complementary signal controls Q2.

The separation in wavelength between the emissive wavelengths $\lambda_1$ and $\lambda_2$ of CR1 and CR2, respectively, must be sufficient to permit discrimination at the detectors while maintaining both signals within the bandwidth of the optical amplifier. CR1 and CR2 may be implemented with distinct laser diodes or may be fused together. For fused diodes, optical coupler 604 may be eliminated.

Detectors 606 and 608 may be PIN diodes, metal-semiconductor-metal (MSM) photo-detectors, or avalanche photo-diodes (APD's). Detector 606 is sensitive to the wavelength $\lambda_1$ of the optical data signal, while detector 608 is sensitive to the wavelength $\lambda_2$ of the complementary signal. Detectors 606 and 608 may be fused or discreet devices. If discreet devices are used, then wavelength splitter 605 will separate the combined optical beams as discussed above. Wavelength splitter 605 may be a spectral filter or an interferometer. If detectors 606 and 608 are fused wavelength sensitive devices, then wavelength splitter 605 may be eliminated.

Figure 8:
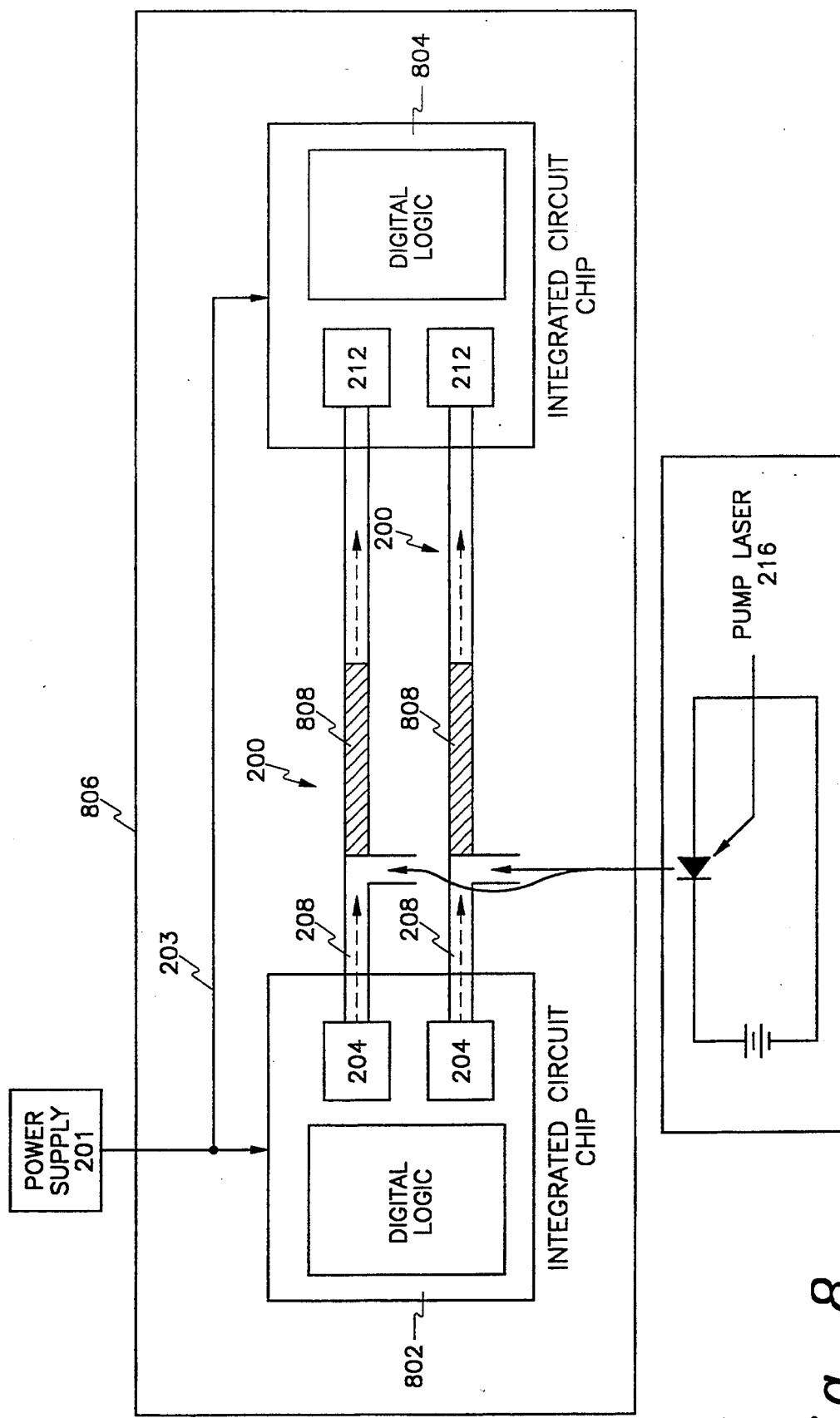
FIG. 8 is a block diagram illustrating the interconnection of two integrated circuit chips on a printed circuit board in accordance with the invention.

FIG. 8 illustrates an example implementation of the invention. A plurality of links 200 are used to interconnect a first integrated circuit chip 802 to a second integrated circuit chip 804 on a circuit board 806. Chips 802,804 are powered by power supply 201 via power distribution network 203. Optical sources 204 of chip 802 communicate with photo detectors 212 over optical paths 208. Optical paths 208 include doped regions 808 which are pumped by pump laser 216.

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. A method for improving the signal-to-noise ratio of an electrical data signal transmitted between a first integrated circuit chip and a second integrated circuit chip on a circuit board, said method comprising:

amplifying the electrical data signal at the first integrated circuit chip with an electrical amplifier to produce an amplified electrical data signal, said electrical amplifier being supplied by a power distribution network, said amplified electrical data signal having a low power level to prevent said electrical amplifier from causing significant disturbances in said power distribution network such that a plurality of said electrical amplifiers can be proximately located and operated concurrently without significant noise coupling occurring between said plurality of said electrical amplifiers through said power distribution network;

converting said amplified electrical data signal to a low intensity optical data signal for transmission to the second integrated circuit chip;

transmitting said low intensity optical data signal through an optical path;

optically amplifying said low intensity optical data signal within the optical path;

receiving said amplified optical data signal at the second integrated circuit chip; and detecting said amplified optical data signal to produce an electrical signal representing said first electrical data signal:

wherein said low intensity optical data signal has insufficient amplitude prior to being optically amplified to be reliably detected at the second integrated circuit chip.

2. The method set forth in claim 1 wherein said optical path is a doped waveguide.

3. The method set forth in claim 2 wherein the step of optically amplifying comprises optically pumping said doped waveguide.

4. The method set forth in claim 1 wherein said optical path is a semiconductor waveguide.

5. The method set forth in claim 4 wherein the step of optically amplifying comprises optically pumping said semiconductor waveguide.

6. The method set forth in claim 5 wherein the step of optically amplifying comprises electrically pumping said semiconductor waveguide.

7. A method for improving the signal-to-noise ratio of an electrical data signal transmitted between a first integrated circuit chip and a second integrated circuit chip on a circuit board, said method comprising:

generating an electrical complement data signal, said electrical complement data signal being the complement of the electrical data signal;

amplifying the electrical data signal at the first integrated circuit chip with a first electrical amplifier to produce an amplified electrical data signal;

amplifying the electrical complement data signal at the first integrated circuit chip with a second electrical amplifier to produce an amplified electrical complement data signal, said first and second electrical amplifiers being supplied by a power distribution network, said amplified electrical data signal and said amplified electrical complement data signal each having a low power level to prevent said first and second electrical amplifiers from causing significant disturbances in said power distribution network such that a plurality of said first and second electrical amplifiers can be proximately located and operated concurrently without significant noise coupling occurring between said plurality of said first and second electrical amplifiers through said power distribution network;

converting the amplified electrical data signal to a low intensity optical data signal of wavelength $\lambda_1$ for transmission to the second integrated circuit chip;

converting said amplified electrical complement data signal to a low intensity optical complement data signal of wavelength $\lambda_2$ for transmission to the second integrated circuit chip;

transmitting said low intensity optical data signal and said low intensity optical complement data signal through a single optical path;

optically amplifying said low intensity optical data signal and said low intensity optical complement data signal;

receiving said amplified optical data signal and said amplified optical complement data signal at the second integrated circuit chip;

detecting said amplified optical data signal to produce a first electrical signal;

detecting said amplified optical complement data signal to produce a second electrical signal; and differentiating said first and second electrical signals to produce an electrical signal representing said electrical data signal;

wherein said low intensity optical data signal and said low intensity optical complement data signal each have insufficient amplitude prior to being optically amplified to be reliably detected at the second integrated circuit chip.

8. The method set forth in claim 7 wherein said optical path is a doped waveguide.

9. The method set forth in claim 8 wherein the step of optically amplifying comprises optically pumping said doped waveguide.

10. The method set forth in claim 7 wherein said optical path is a semiconductor waveguide.

11. The method set forth in claim 10 wherein the step of optically amplifying comprises optically pumping said semiconductor waveguide.

12. The method set forth in claim 10 wherein the step of optically amplifying comprises electrically pumping said semiconductor waveguide.

13. An optical interconnection system for communicating an electrical data signal from a first integrated circuit chip to a second integrated circuit chip on a circuit board, said system comprising:

power supply means for supplying power to the system;

electrical amplifying means for amplifying the electrical data signal at the first integrated circuit chip to produce an amplified electrical data signal, said electrical amplifying means being supplied power by said power supply means, said amplified electrical data signal having a low power level to prevent said electrical amplifying means from causing significant disturbances in said power supply means such that a plurality of said electrical amplifying means can be proximately located and operated concurrently without significant noise coupling occurring between said plurality of said electrical amplifying means through said power supply means;

means for converting said amplified electrical data signal to a low intensity optical data signal for transmission to the second integrated circuit chip;

waveguide means for guiding said low intensity optical data signal to the second integrated circuit chip;

optical amplifying means for amplifying said low intensity optical data signal; and detector means for receiving said amplified optical data signal at the second integrated circuit chip, for detecting said amplified optical data signal, and for producing an electrical signal representing the amplified optical data signal;

wherein said low intensity optical data signal produced by said converting means has insufficient amplitude prior to being optically amplified to be reliably detected by said detector means.

14. An optical interconnection system for communicating an electrical data signal from a first integrated circuit chip to a second integrated circuit chip on a circuit board said system comprising:

power supply means for supplying power to the system;

first electrical amplifying means for amplifying the electrical data signal at the first integrated circuit chip with a first electrical amplifier to produce an amplified electrical data signal;

second electrical amplifying means for amplifying an electrical complement data signal at the first integrated circuit chip to produce an amplified electrical complement data signal, said first and second electrical amplifying means being supplied power by said power supply means, said amplified electrical data signal and said amplified electrical complement data signal each having a low power level to prevent said first and second electrical amplifying means from causing significant disturbances in said power supply means such that a plurality of said first and second electrical amplifying means can be proximately located and operated concurrently without significant noise coupling occurring between said plurality of said first and second electrical amplifying means through said power supply means;

first means for converting said amplified electrical data signal to a low intensity optical data signal of wavelength $\lambda_1$ for transmission to the second integrated circuit chip;

second means for converting said amplified complement electrical data signal to a low intensity optical complement data signal of wavelength $\lambda_2$ for transmission to the second integrated circuit chip;

waveguide means for guiding said low intensity optical data signal and said low intensity optical complement data signal to the second integrated circuit chip;

optical amplifying means for amplifying said low intensity optical data signal and said low intensity optical complement data signal;

first detector means responsive to an optical signal of wavelength $\lambda_1$ for receiving said amplified optical data signal at the second integrated circuit chip, for detecting said amplified optical data signal, and for producing a first electrical signal representing said amplified optical data signal;

second detector means responsive to an optical signal of wavelength $\mu_2$ for receiving said low intensity optical complement data signal at the second integrated circuit chip, for detecting said low intensity optical complement data signal, and for producing a second electrical signal representing said low intensity optical complement data signal; and differential amplifier means for differentiating said first and second electrical signals to produce a third electrical signal representing said electrical data signal;

wherein said low intensity optical data signal and said low intensity optical complement data signal each have insufficient amplitude prior to being optically amplified to be reliably detected at the second integrated circuit chip.

15. The optical interconnection system of claim 14, wherein said first means for converting is a first laser diode having an emissive wavelength $\lambda_1$, said second means for converting is a second laser diode having an emissive wavelength $\lambda_2$, and said first and second laser diodes are fused together.

16. The optical interconnection system of claim 15, wherein said first detector means is a photo-detector capable of detecting light at a wavelength $\lambda_1$, said second detector means is a second photo-detector capable of detecting light at a wavelength $\lambda_2$, and said first and second photo-detectors are fused together.

17. The method set forth in claim 7, wherein said first electrical amplifier forms a first half of a differential pair amplifier, and said second electrical amplifier forms the other half of said differential pair amplifier.

18. The optical interconnection system of claim 14, wherein said first electrical amplifying means comprises a first half of a differential pair amplifier, and said second electrical amplifying means comprises the other half of said differential pair amplifier.

* * * * *